(12) United States Patent
Takahashi (10) Patent No.: US 8,082,257 B2
(45) Date of Patent: Dec. 20, 2011

(54) RECORDING AND REPRODUCING APPARATUS

(75) Inventor: Kazuhiro Takahashi, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 11/050,506

(22) Filed: Feb. 3, 2005

(65) Prior Publication Data

US 2005/0192982 A1  Sep. 1, 2005

(30) Foreign Application Priority Data

Feb. 27, 2004 (JP) .................................. 2004-053234

(51) Int. Cl.
*G06F 7/00* (2006.01)
*G06F 17/30* (2006.01)

(52) U.S. Cl. .................. 707/741; 707/831; 348/207.99; 369/30.4

(58) Field of Classification Search ............... 369/30.4; 707/741, 831; 348/207.99
See application file for complete search history.

(56) References Cited

U.S. PATENT DOCUMENTS

| | | | | |
|---|---|---|---|---|
| 5,444,482 | A * | 8/1995 | Misawa et al. ................ | 386/120 |
| 5,502,804 | A * | 3/1996 | Butterfield et al. ........... | 715/502 |
| 6,345,143 | B2 * | 2/2002 | Kanda ............................ | 386/52 |
| 6,424,795 | B1 * | 7/2002 | Takahashi et al. ............ | 386/120 |
| 6,604,236 | B1 * | 8/2003 | Draper et al. .................. | 717/170 |
| 6,928,613 | B1 * | 8/2005 | Ishii et al. ..................... | 715/726 |
| 6,992,710 | B2 * | 1/2006 | Nagaoka ...................... | 348/231.2 |
| 7,227,821 | B2 * | 6/2007 | Horii et al. ................... | 369/47.16 |
| 7,437,055 | B2 * | 10/2008 | Hamada et al. ................ | 386/69 |
| 7,545,407 | B2 * | 6/2009 | Um et al. ................. | 348/207.99 |
| 7,580,613 | B2 * | 8/2009 | Kato et al. ....................... | 386/95 |
| 2002/0073105 | A1 * | 6/2002 | Noguchi et al. .............. | 707/200 |
| 2003/0049029 | A1 | 3/2003 | Murakami | |
| 2003/0052986 | A1 * | 3/2003 | Matsumoto .............. | 348/333.05 |
| 2003/0061370 | A1 * | 3/2003 | Nakayama et al. ........... | 709/231 |
| 2003/0081515 | A1 * | 5/2003 | Horii et al. .................. | 369/47.16 |
| 2003/0093634 | A1 * | 5/2003 | Yamada et al. ............... | 711/154 |
| 2003/0182297 | A1 | 9/2003 | Murakami | |
| 2004/0042350 | A1 * | 3/2004 | Yamanushi et al. .............. | 369/2 |
| 2004/0049489 | A1 * | 3/2004 | Yabe ................................ | 707/1 |
| 2004/0058716 | A1 * | 3/2004 | Son ............................... | 455/566 |
| 2004/0098476 | A1 * | 5/2004 | Kawase et al. ................ | 709/223 |
| 2004/0143598 | A1 * | 7/2004 | Drucker et al. ............ | 707/104.1 |
| 2004/0148367 | A1 * | 7/2004 | Takano et al. ................. | 709/220 |
| 2004/0179124 | A1 * | 9/2004 | Morimoto et al. ........ | 348/333.02 |

(Continued)

FOREIGN PATENT DOCUMENTS

EP  1513152 A1 *  3/2005

OTHER PUBLICATIONS

Nikon, Nikon Digital Camera Coolpix 800 Reference Manual, Sep. 24, 1999, p. 1-53.*

(Continued)

*Primary Examiner* — Shew-Fen Lin (57) ABSTRACT

A data processing apparatus includes a management file creating portion for creating a first management file for managing reading of an information data file recorded on a recording medium and a second management file for managing a predetermined function related to data recorded on the recording medium, a designation portion for designating a function associated with the recording medium, and a control portion for performing the function designated by the designation portion based on the first management file and the second management file created by the management file creating portion.

7 Claims, 10 Drawing Sheets

U.S. PATENT DOCUMENTS

2006/0013562 A1* 1/2006 Sugino et al. .................... 386/95
2006/0051062 A1* 3/2006 Kusaka et al. ................... 386/95
2006/0110153 A1* 5/2006 Yanagida et al. ............. 396/310

OTHER PUBLICATIONS

DVD Forum, "Guidebook for DVD-Video Text Data Usage", Sep. 1999, Version 1.0, Selected Pages.* www.OSTA.org, "MPV FAQ", Mar. 11, 2003, p. 1-5, hereinafter MPV_FAQ.*

Jeita, "Design rule for Camera File System DCF Version 2.0", Jul. 9, 2003, p. 1-54.*

Jeida, "Digital Still Camera Image File Format Standard", Dec. 1998, Japan Electronic Industry Development Assoc., 174 pages, <Retrieved from www.exif.org/dcf-exif.PDF Apr. 15, 2009>.*

* cited by examiner

| ATTRIBUTE | |
|---|---|
| MPEG1 | 0×01 |
| MPEG2 | 0×02 |
| MPEG4 | 0×03 |
| JPEG | 0×04 |
| MP2 | 0×10 |
| MP3 | 0×11 |
| AAC | 0×12 |
| PCM | 0×13 |
| BMP | 0×20 |
| TEXT | 0×30 |
| TIME MAP | 0×40 |
| RESERVE | 0×50 |
| PLAYLIST | 0×80 |
| EFFECT | 0×90 |
| RESERVE | 0×A0 |
| GROUP FOLDER | 0×B0 |
| RESERVE | 0×C0-0×FE |
| EXTENSION | 0×FF |

BASIC MANAGEMENT FILE: MPEG1 through RESERVE (0×50)

FIG.7

| ATTRIBUTE |
| --- |
| INDEX No. |
| INDEX No. OF PARENT DIRECTORY |
| INDEX No. OF THUMBNAIL |
| FOLDER NAME |
| EXTENDED INDEX OF ADDITIONAL INFORMATION |
| NUMBER (N) OF MEMBERS |
| MEMBER 1 (INDEX No.) |
| MEMBER 2 (INDEX No.) |
| ⋮ |
| MEMBER N (INDEX No.) |

RECORDING AND REPRODUCING APPARATUS

BACKGROUND OF THE INVENTION

1. Field of the Invention

The present invention relates to a recording and reproducing apparatus, and more particularly to the management of information data files to be recorded on or reproduced from a recording medium.

2. Description of the Related Art

Apparatuses configured to record or reproduce digital video or audio data on or from disk recording media have been known in the prior art. In such apparatuses, information data are generally recorded or reproduced as files using a file system, such as UDF (Universal Disk Format) or FAT (File Allocation Tables).

In addition, recently, digital video cameras have come onto the market, which record and reproduce captured video data on or from disk recording media or memory cards. These video cameras are already equipped with the function of transmitting a part of recorded video data to a printer for printing, the function of displaying a thumbnail view of recorded images, the function of automatically reproducing and displaying a series of images selected from recorded images in a given order in a slide show, or the like.

In this case, the above function is implemented by creating a management file indicative of a group of image data to be printed or a management file for managing a group of image data to be reproduced in a slide show. Such a management file is managed and processed by an application program associated with the above function.

The recording capacity of a disk recording medium or a memory card for use with video cameras is dramatically increasing yearly. Along with this increase, the number of files recordable in a single recording medium is also increasing. In addition, various editing functions utilizing characteristics of a random-access recording medium, such as a disk recording medium or a memory card, represent features of such a type of video camera.

Accordingly, in order to meet the increased recording capacity of recording media or the increased functions of apparatuses, various methods of effectively managing recording contents have been proposed, for example, in Japanese Laid-Open Patent Application No. 2002-247488 (corresponding to U.S. Patent Application Publication No. U.S. 2003/0049029 A1) and Japanese Laid-Open Patent Application No. 2002-278996.

However, in cases where an application program accesses each file directly using a file system, as in a conventional system, as the number of files or the number of groups increases, it becomes difficult to manage these files or groups in a lump. Therefore, it takes a long time to search for necessary information.

Furthermore, when a file is to be identified via the file system, the type of the file must be determined only from the file extension. Therefore, if video or audio files have the same type of file extension, it is difficult to distinguish these files. This hinders speedy searching.

In addition, when a plurality of recorded files are reproduced in a time-series manner, it is necessary to access all of the files and rearrange them in the order of time of recording. In this case, it is possible to hold time-series information by exercising ingenuity in defining a directory structure or file names. However, the degree of freedom for the directory structure or file names decreases, causing inconvenience with respect to file management.

Moreover, if the above-described management file is used, it is necessary to create a management file for every group. Therefore, in order to obtain information about the members or the like included in each management file, it is necessary to open and check each management file. This is troublesome and inconvenient in respect of file management. In addition, since different formats are applied to the respective application programs using management files, there is a problem with versatility in that one management file cannot be used by different application programs.

Furthermore, even if a management file dedicated to an application program is used, the application program accesses each file directly using the file system. Therefore, the problem that it takes a long time to search for necessary information remains unsolved.

In Japanese Laid-Open Patent Application No. 2002-247488, contents can be managed as index files. In Japanese Laid-Open Patent Application No. 2002-278996, a virtual directory different from a file system is created, so that contents can be managed for every folder.

However, in the above applications, if a consumer apparatus having a relatively low processing performance with respect to the increasing amount of content is used, operationality lowers when the processing performance for index files or folder management is insufficient. Therefore, a further improvement is required in content management.

Furthermore, in the above applications, highly functional content management cannot be applied to low-cost, low-performance apparatuses in terms of processing capability and display capability.

SUMMARY OF THE INVENTION

The present invention is directed to implementing optimum content management according to functions of an apparatus.

In one aspect of the present invention, a data processing apparatus includes management file creating means for creating a first management file for managing reading of an information data file recorded on a recording medium and a second management file for managing a predetermined function related to data recorded on the recording medium, designation means for designating a function associated with the recording medium, and control means for performing the function designated by the designation means based on the first management file and the second management file created by the management file creating means.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

Figure 2:
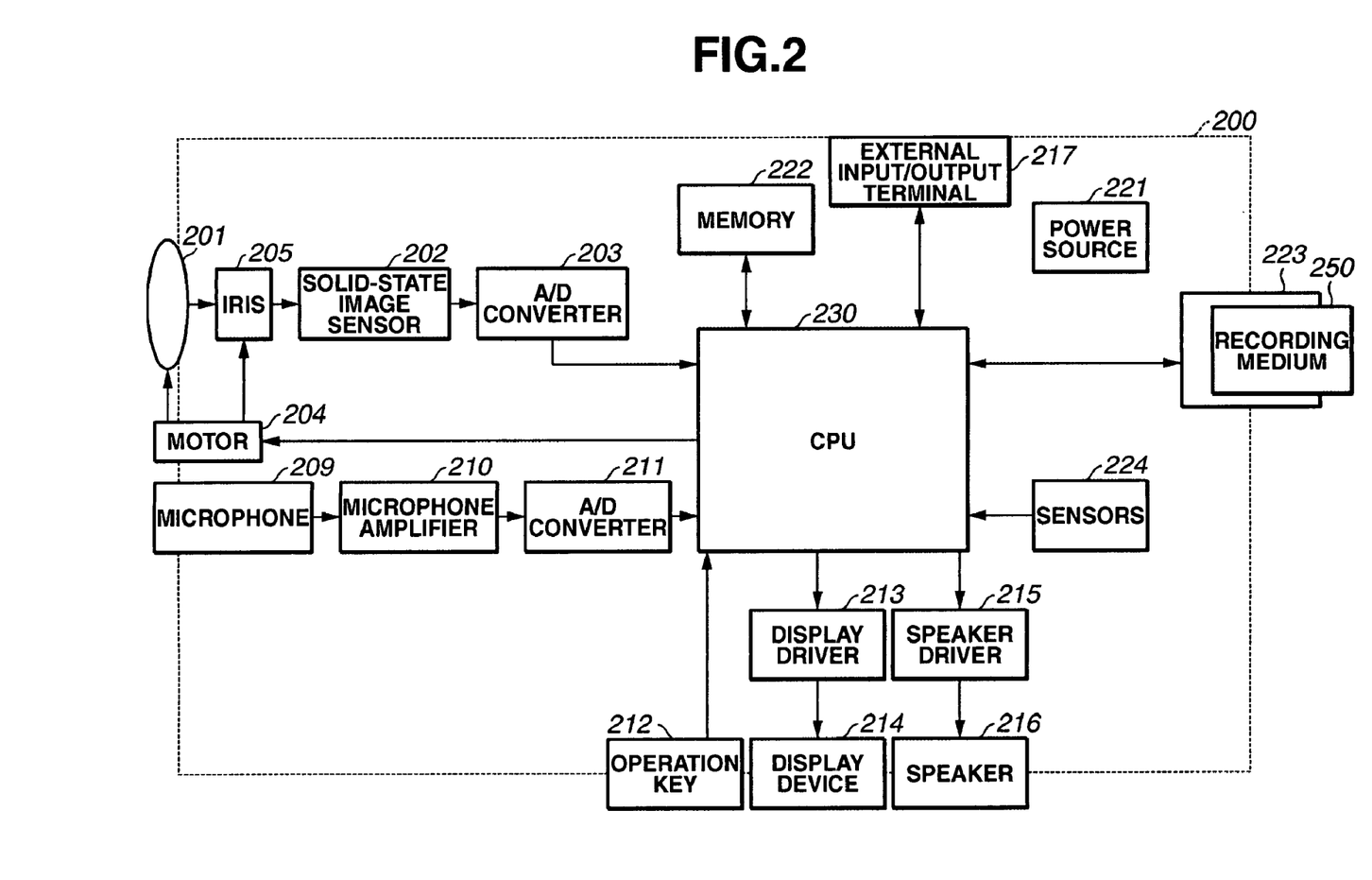
FIG. 2 is a block diagram showing an image capture apparatus according to the embodiment of the invention.

FIG. 2 is a block diagram showing an image capture apparatus 200 according to an embodiment of the invention.

In FIG. 2, the image capture apparatus 200 includes a lens 201, a solid-state image sensor 202, an A/D converter 203, an iris 205, a motor 204, a microphone 209, a microphone amplifier 210, an A/D converter 211, an operation key 212, a display driver 213, a display device 214, a speaker driver 215, a speaker 216, an external input/output terminal 217, various sensors 224, a recording medium 250, a recording and reproducing portion 223, a CPU (central processing unit) 230, a memory 222, and a power source 221. The lens 201 forms an image to be captured. The solid-state image sensor 202 converts the formed image into an electrical signal. The A/D converter 203 converts the electrical signal into digital data. The motor 204 drives the lens 201 and the iris 205. The microphone 209 collects sound. The microphone amplifier 210 amplifies sound. The A/D converter 211 converts sound into digital data. The operation key 212 is used to operate the image capture apparatus 200. The display driver 213 forms a video image conforming to a display format. The display device 214 is an LCD (liquid crystal display) device or an EVF (electronic viewfinder) for displaying the video image. The speaker driver 215 drives the speaker 216 to output sound. The external input/output terminal 217 is configured to input and output a variety of information. The recording and reproducing portion 223 records and reproduces a variety of data on or from the recording medium 250. The CPU 230 controls the whole image capture apparatus 200. The memory 222 is used by the CPU 230.

Recording operation of the image capture apparatus 200 is described below with reference to FIG. 2.

Light from an object passes through the lens 201 and the iris 205 and is then incident on the solid-state image sensor 202. The solid-state image sensor 202 converts the incident light into an electrical signal. The A/D converter 203 performs sampling to convert the electrical signal into digital data. The digital data is supplied to the CPU 230 as a digital video signal composed of a luminance signal Y and color-difference signals Cr and Cb or RGB signals. The lens 201 is driven for movement by the motor 204 under the control of the CPU 230 in accordance with the automatic focusing function and the zooming function. The CPU 230 generates a timing signal for fetching data from the solid-state image sensor 202. The iris 205 is driven by the motor 204 under the control of the CPU 230. In cases where the lens 201 has an image stabilizing function (an acceleration sensor, an image stabilizing actuator, etc.), outputs of the acceleration sensor and a location sensor of the image stabilizing actuator are supplied to the CPU 230, and the CPU 230 produces an image stabilizing control signal to cause the motor 204 to drive the image stabilizing actuator.

A sound signal obtained by the microphone 209 is amplified by the microphone amplifier 210. The A/D converter 211 performs sampling to convert the amplified sound signal into digital data. The digital data is supplied to the CPU 230. The CPU 230 applies, to the digital video signal, basic processing including color separation, white balance, gamma correction, aperture correction, etc., and additional processing including image-size setting, image-quality adjustment, position adjustment, etc., which are set by the operation key 212 of the image capture apparatus 200. In addition, the CPU 230 applies, to the digital video signal, image compression processing compliant with the MPEG (Moving Picture Experts Group) standard in accordance with a set compression method and compression parameters, thus obtaining compressed image data.

The CPU 230 also applies, to the sound data, additional processing including sound-quality adjustment, etc., which are set by the operation key 212 of the image capture apparatus 200, and sound compression processing in accordance with a set compression method and compression parameters, thus obtaining compressed sound data. The compressed image data and the compressed sound data together with control data constitute a data stream, such as a program stream or transport stream, defined by the MPEG standard.

The control data represents additional image-capture information, such as information on the image capture apparatus 200 itself, information on setting of image and sound recording, information on image-capture conditions, etc.

The CPU 230 controls the recording and reproducing portion 223 on the basis of a file system, such as UDF or FAT, to record on the recording medium 250 a data stream composed of image data and sound data as a content file. In addition, as described later, the CPU 230 creates a management file for managing each content recorded on the recording medium 250 and implements various functions, such as recording, reproduction, etc., using the management file.

The file system represents a structural system composed of file data and management information for managing files. Employing the file system in common allows different recording media or different recording and reproducing apparatuses to be used for recording and reproduction.

The data stream is sent to the external input/output terminal 217 if necessary. In addition, a video image represented by the data stream is displayed on the display device 214 via the display driver 213 for confirmation. The power source 221 supplies electric power to each circuit block of the image capture apparatus 200.

Examples of the recording medium 250 include, but are not limited to, a memory card, such as MMC (Multimedia Card), SSFDC (Solid-State Floppy Disk Card), SD (Secure Digital), Compactflash®, PC card, etc., and a magnetic (or magneto-optical) recording medium, such as hard disk, CD-RW (Compact Disc-Rewritable), FD (Floppy Disk), MD (Mini Disc), DVD-RAM (Digital Versatile Disc-random-access memory), etc.

In the present embodiment, a disk-shaped magneto-optical recording medium is used as the recording medium 250. The recording and reproducing portion 223 contains a mechanism for mounting and ejecting such a magneto-optical disk and an optical pickup unit for radiating a light beam onto the magneto-optical disk.

Figure 1:
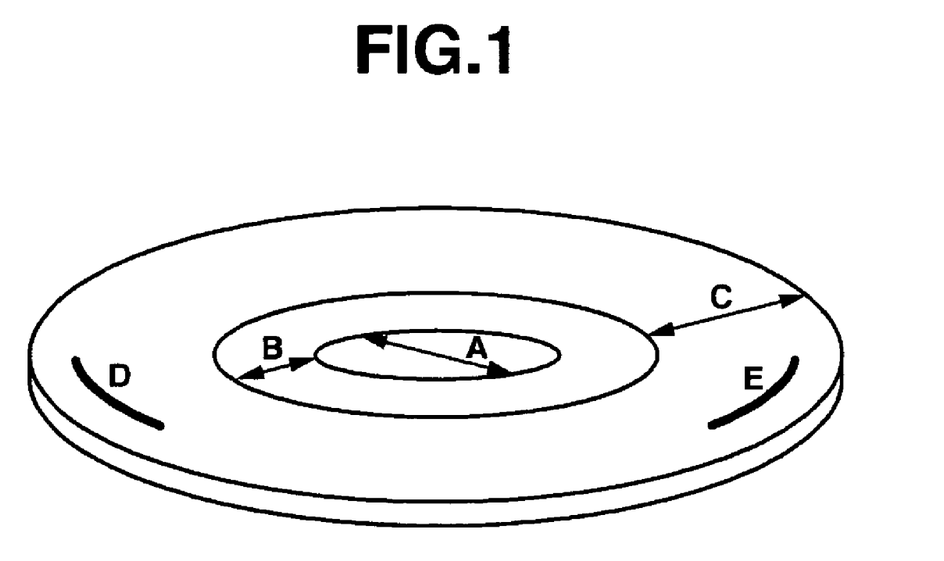
FIG. 1 is a perspective view showing a disk recording medium for use in an embodiment of the invention.

FIG. 1 shows the appearance of the magneto-optical disk. Data are recorded, as digital data, on concentric tracks of the magneto-optical disk. In FIG. 1, a portion A is a hole for the chucking of the magneto-optical disk during rotation. A portion B is a management area on which to record data for managing data to be recorded on the magneto-optical disk. A portion C is a data area on which to record information data. Curves D and E schematically indicate recording of information data.

Figure 3:
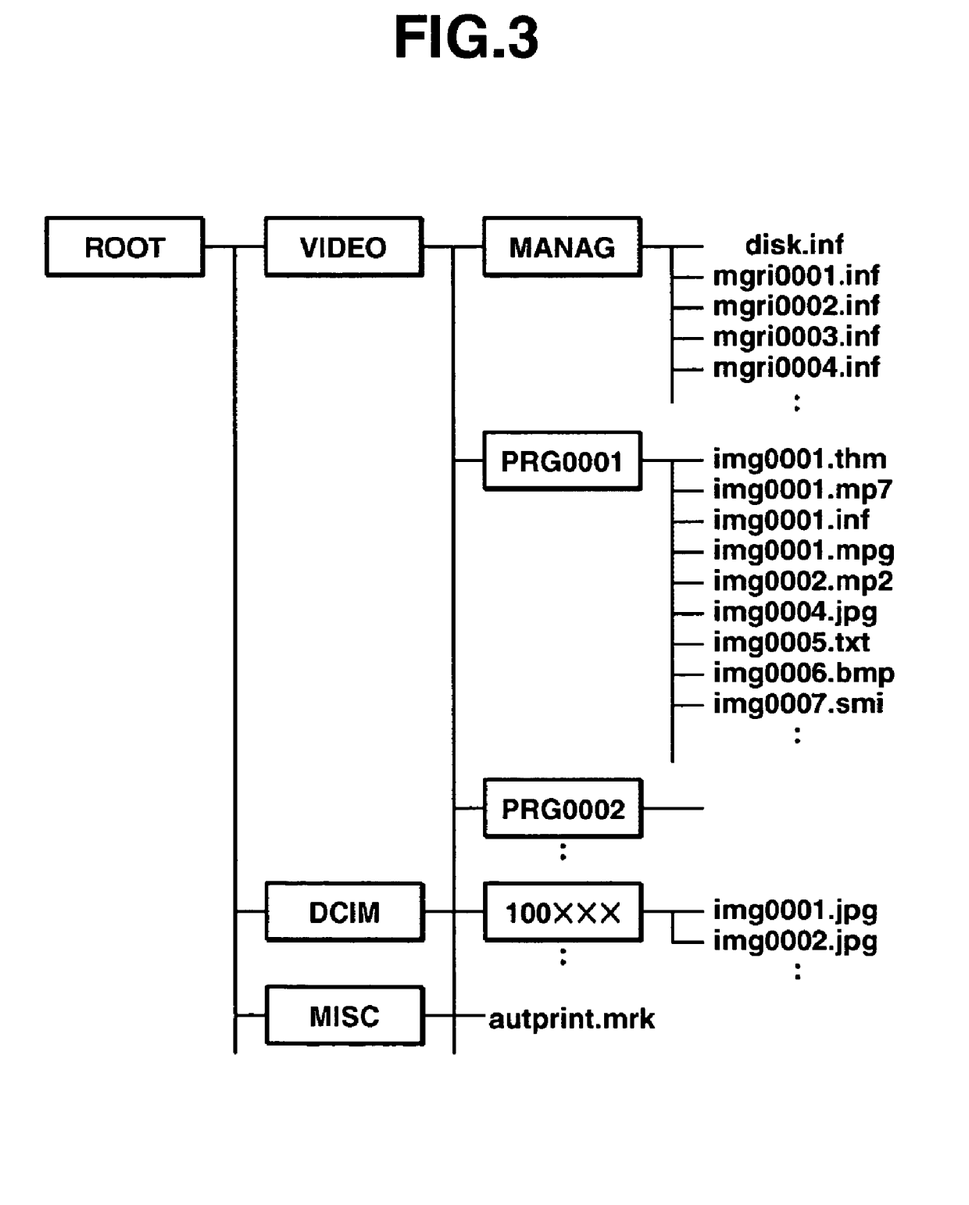
FIG. 3 is a diagram showing an example of a directory structure of files recorded on a recording medium according to the embodiment of the invention.

FIG. 3 is a diagram showing an example of a directory structure of files recorded on the recording medium 250 according to the embodiment of the invention.

Referring to FIG. 3, VIDEO, DCIM and MISC directories are located under a ROOT directory. A MANAG directory for file management is located under the VIDEO directory. The MANAG directory contains a file disk.inf having attributes of the recording medium 250 described therein, and files mgri0001.inf, mgri0002.inf, mgri0003.inf, mgri0004.inf, . . . , for managing content files recorded on the recording medium 250. Content files recorded on the recording medium 250 are managed using these management files, as described later.

In addition, a PRG0001 directory located under the VIDEO directory contains a group of content files, a file img0001.thm having representative images of the group of content files collectively recorded therein, and a file img0001.mp7 having titles of the group of content files, a search table, additional information, maintenance information, etc., collectively recorded therein. The search table is a hash table having attributes, title, date, ancillary information, etc., of a content file as keys. Examples of content files include an MPEG data file img0001.mpg, an information file img0001.inf having time stamps, structure information, etc., of the MPEG data stream recorded therein, an MPEG sound data file img0002.mp2, a JPEG still-image file img0004.jpg, a text data file img0005.txt, a bit-mapped image file img0006.bmp, a playlist file img0007.smi having the order of reproduction of the group of content files described therein, etc.

If the number of content files or the content file number is greater than a predetermined value, or if a predetermined condition is changed, a new directory, such as PRG0002, is created under the VIDEO directory, and content files are located under the new directory. For example, in cases where a content file to be recorded is an MPEG data stream, a file name obtained by incrementing a previously-recorded content file's number by one is used. That is, a content file named img0008.mpg is recorded in the position of ¥VIDEO¥PRG0002. In this case, an information file img0008.inf indicating information on a data stream obtained at the time of creation of an MPEG2 file is also recorded along with the data file img0008.mpg. In addition, a DCIM directory defined by the DCF standard (Design rule for Camera File system) or a MISC directory defined by the DPOF standard (Digital Print Order Format) can be located under the ROOT directory and contain content files created according to these standards.

Content management files are now described in detail below.

Content management files can be used to manage directories and files contained inside the VIDEO directory shown in FIG. 3 or all directories and files contained inside the ROOT directory recorded on a recording medium, or can also be linked to content files located outside a recording medium, for example, content files located on an intranet or the Internet. In the present embodiment, the content management files are used to manage directories and files contained inside the ROOT directory.

Figure 4:
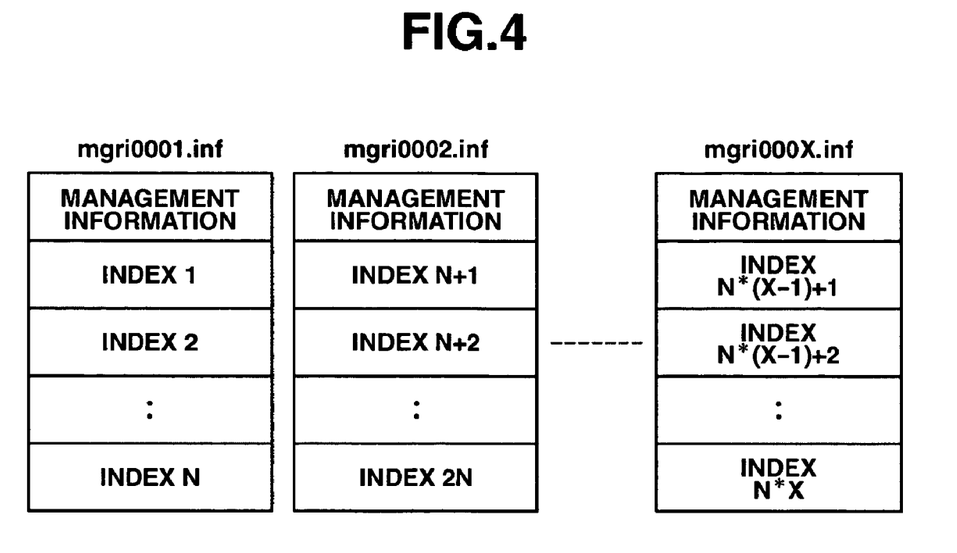
FIG. 4 is a diagram showing the structure of management files according to the embodiment of the invention.

FIG. 4 is a diagram showing the structure of management files (index files) according to the present embodiment, including a plurality of management files mgri0001.inf, mgri0002.inf, . . . , mgri000X.inf. "X" of mgri000X.inf is an arbitrary integer. For example, if X is 4, four types of management files (index files) exist. In the present embodiment, in addition to one basic management file, a management file is created for every function, such as a grouping function or a playlist function.

At the head of each management file, ancillary information is described as management information. The ancillary information includes information on an index type, an effective index identifier, a version of the standard, a compatibility level, a unique number of the recording medium, a file size, the number of indexes in use, the maximum number of indexes, date of creation, updating, access, etc., a creator, text information, etc. Each management file contains up to N indexes.

In the present embodiment, the first management file mgri0001.inf is used as a basic management file. The second management file mgri0002.inf and subsequent management files are respectively created for different functions, as described later.

Figure 5:
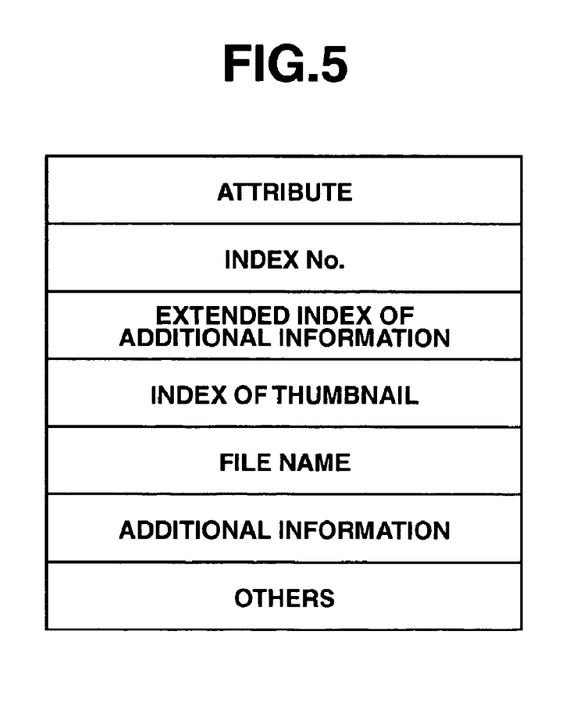
FIG. 5 is a diagram showing indexes contained in a basic management file according to the embodiment of the invention.

FIG. 5 is a diagram showing, as an example, indexes contained in a management file according to the present embodiment.

In the present embodiment, an index is information related to a content file, such as the MPEG image file img0001.mpg shown in FIG. 3, or information related to a function content, such as a grouping function based on date or a playlist (PLF).

FIG. 5 shows indexes related to a content file, such as an image file or a sound file. These indexes describe an attribute, an index number, an extended index of additional information, an index of a thumbnail, a file name, additional information of the content, and other items.

The playlist is data (file) indicating the order of reproduction of content files recorded on the recording medium 250. The playlist is described by means of a description language, such as SMIL (Synchronized Multimedia Integration Language).

Figure 6:
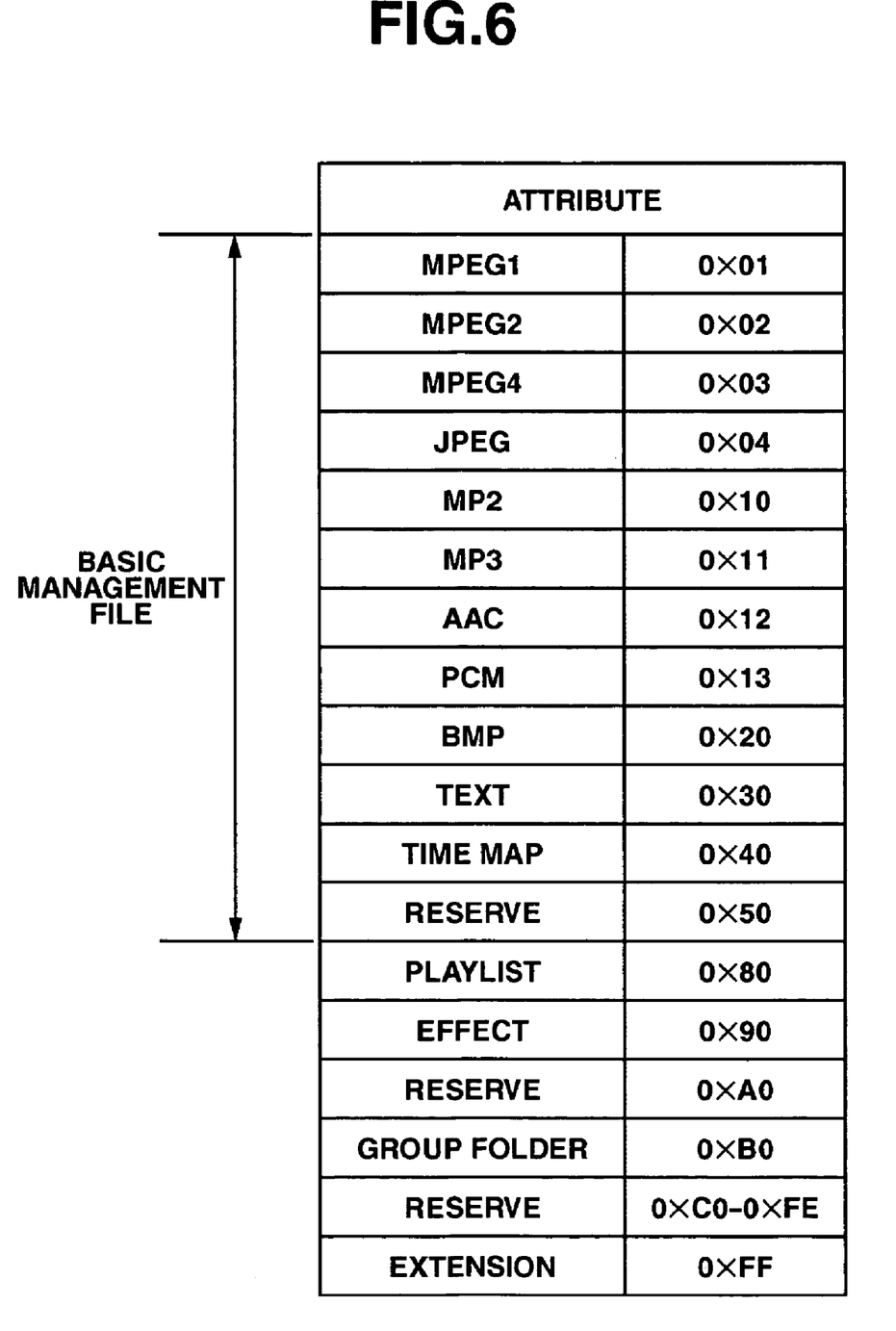
FIG. 6 is a diagram showing examples of attributes described in indexes.

FIG. 6 shows examples of attributes described in indexes. In the present embodiment, content files having various attributes shown in FIG. 6 are managed using management files. Among the attributes of contents, for example, MPEG1 is represented by 0x01, MPEG2 by 0x02, MPEG4 by 0x03, . . . , a playlist by 0x80, an effect by 0x90, and a group folder (to be described later) by 0xB0. 0x50, 0xA0 and 0xC0 through 0xFE are reserved. In addition, 0xFF represents an extended attribute inherent in a manufacturer. In cases where the same file name is employed in different directories, the file name needs to be described with the full path. This complicates file management. Therefore, the file name is made to contain the value of an attribute so as to make file management easy. For example, attributes are represented as follows. VIDEO directory=0x00. DCF directory=0x01. External-apparatus directory=0x80.

Among the attributes shown in FIG. 6, attributes 0x01 through 0x50 are described by the basic management file mgri0001.inf, and the other attributes are described by different management files, i.e., the management file mgri0002.inf and subsequent management files.

In the present embodiment, every time processing, such as recording or deletion of a content file, is performed on the recording medium 250, the content of the basic management file having indexes recorded therein is modified correspondingly with the performed processing.

In addition, for example, in cases where a user newly creates a PLF (playlist), the index of the new PLF is not described in the basic management file. Instead, a new management file for PLF is created as mgri0002.inf, and information on the new PLF is described as an index contained in the management file mgri0002.inf. Moreover, in cases where a user creates a group obtained by selecting a part of image files recorded on the recording medium 250, the index of the group is not described in the basic management file. Instead, a new management file for group is created, and information on the group is described as an index contained in the management file for group.

In this instance, information indicative of the attribute of each management file newly created other than the basic management file, such as PLF or group, is stored in the management file.

Figure 7:
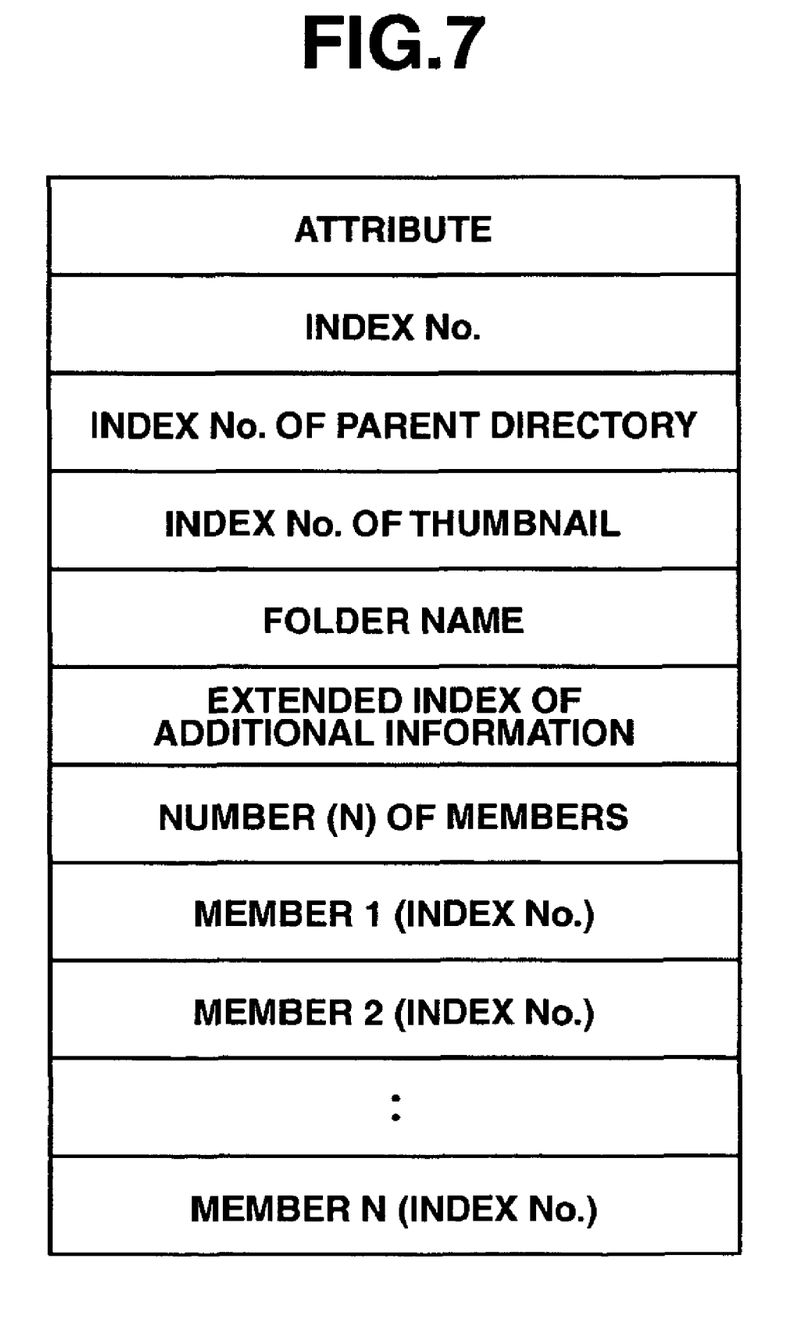
FIG. 7 is a diagram showing indexes contained in a management file for a group folder.

FIG. 7 shows examples of indexes contained in the management file for group. In the present embodiment, a group can be handled as a hierarchy structure.

Indexes of a group include an attribute, an index number of the group, an index number of a parent directory, an index of a thumbnail, a folder name, an extended index of additional information, the number (N) of members registered in the group, and respective index numbers of a member 1, member 2, . . . , member N. If the number of members is represented by a specific numerical value, such as 0xFFFF, this indicates that the group is not in the lowest-layer directory. Each index number is uniquely determined in one recording medium.

Each index may have either a fixed length or a variable length. In the case of a variable length, each index has size information added thereto. In addition, the size of a fixed length or a variable length is N times the sector or cluster size of a file system, so that access to files can be made easy.

Figure 8:
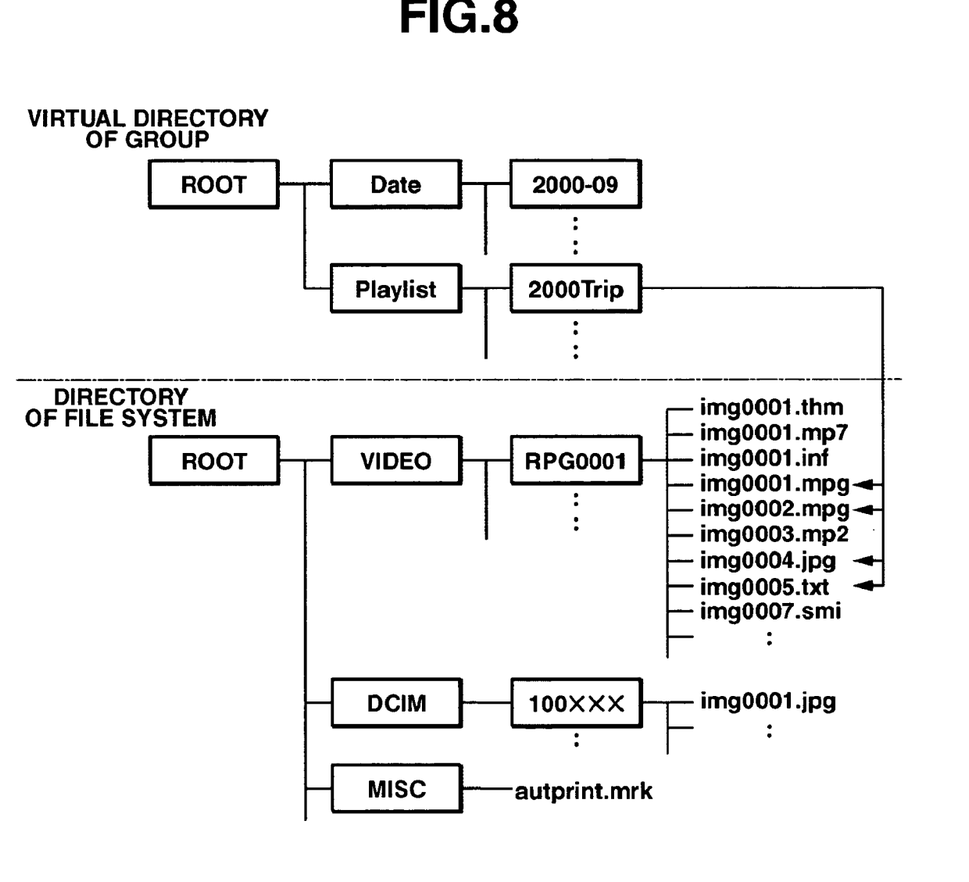
FIG. 8 is a diagram illustrating the relationship between a directory of a file system and a virtual directory of a group.

FIG. 8 is a diagram illustrating the relationship between a directory of a file system and a virtual directory of a group. In the image capture apparatus 200, writing and reading of content files on or from the recording medium 250 are performed in accordance with the file system. More specifically, when information on an image file designated by the above-described management file, for example, a file name, is transferred to the file system, the file system detects the recording address of an image file having that file name, thus enabling the image file to be read out in response to an instruction for reproduction.

In addition, a virtual directory hierarchy of a group is created using the indexes of a group folder shown in FIG. 7.

More specifically, in the present embodiment, if a user designates a group of content files that are selected, the CPU 230 creates a directory structure corresponding to the designated group. Further, the CPU 230 stores the selected content files in the respective lowest-layer directories and creates a management file for the group corresponding to the directory structure.

For example, in FIG. 8, if the user selects four content files img.0001.mpg, img.0002.mpg, img.0004.jpg and img.0005.text and issues an instruction for creating a group named 2000Trip, the CPU 230 creates a directory named Playlist under the virtual ROOT directory and further creates a directory 2000Trip under the Playlist directory.

Then, according to such a directory structure, the CPU 230 creates a management file for managing the group, and describes, as indexes of the management file, indexes of the group folder shown in FIG. 7. In this instance, the respective index numbers of the content files img.0001.mpg, img.0002.mpg, img.0004.jpg and img.0005.text, which are members of the group, are registered. Since the respective index numbers of the content files are already described in the basic management file, the CPU 230 detects the index numbers of the designated content files and describes the detected index numbers into the indexes of the group folder. Arrows shown in FIG. 8 indicate that the indexes of the group folder 2000Trip created as described above refer to content files in the file system directory.

Processing for displaying the virtual directory created as described above is discussed in detail below.

When an instruction for displaying a list of content files belonging to a group is issued by the user, the CPU 230 checks the content of the management file for group management created as described above and checks the content of each index. Then, the CPU 230 checks the index number of a member described in an index in the lowest-layer directory and detects information on a content file having that index number from the basic management file.

Then, the CPU 230 controls the display driver 213 to display, on the display device 214, the group name "2000Trip" and file names of content files belonging to the group. In addition, the CPU 230 can detect indexes of thumbnails of content files belonging to the group from the indexes of the basic management file, transfer the file names described in the indexes of the thumbnails to the file system, reproduce thumbnail image files from the recording medium 250 and display the thumbnail image files together with the file names on the display device 214.

Moreover, if an instruction for newly creating a different group is issued by the user, the CPU 230 adds indexes of the new group to the previously-created management file for group management.

Furthermore, when the user designates four content files img.0001.mpg, img.0002.mpg, img.0004.jpg and img.0005.text shown in FIG. 8 and performs such editing that these content files are to be reproduced in this order, the CPU 230 creates a file img0007.smi serving as a PLF for designating the content files and describing the order of reproduction and records the file img0007.smi on the recording medium 250 in accordance with the file system. Then, the CPU 230 further creates a management file for PLF and describes "img0007.smi" as an index of the management file.

During reproduction, when an instruction for PLF reproduction is issued by the user, the CPU 230 detects "img0007.smi" from the indexes of the management file for PLF management, transfers the file name "img.0007.smi" to the file system, and reproduces data of the file img0007.smi from the recording medium 250. Then, the CPU 230 reproduces the designated content files from the recording medium 250 in accordance with the content of the PLF.

As described above, in the present embodiment, content files recorded on a recording medium are managed based on a basic management file and a management file created for each attribute. Accordingly, for example, during ordinary recording, only the basic management file needs to be updated. Therefore, management of recorded content files can be implemented at high speed and with ease while performing various functions, such as grouping and editing.

Furthermore, during reproduction, as soon as indexes contained in the basic management file are recognized, a requisite minimum of information can be read out at high speed.

Moreover, since a management file is created for each function, only indexes of a management file corresponding to the designated function need to be read from the recording medium. Therefore, work memory for storing read files can be reduced.

Accordingly, even if the number of content files to be recorded on a recording medium increases in the future, various functions can be implemented without lowering operationality.

Attributes of indexes can include, in addition to the examples shown in FIG. 6, a hierarchy structure of a virtual directory, ancillary information on an information data file, such as the type, size, attribute, reproduction time, representative image, title and metadata of the information data file, link information, copyright information and data-creating-system information on the information data file, etc.

In the above-described embodiment, a management file for group management and a management file for PLF management are individually created at the time of processing for grouping and at the time of processing for editing with PLF, respectively. In addition, management files corresponding to the other functions of the image capture apparatus 200 can be created to implement various functions.

For example, a management file for thumbnail in which an index number of a thumbnail of each content file is described can be created. In this case, when an instruction for displaying a list of thumbnail images recorded on a recording medium is issued by the user, the CPU 230 detects only files having the index numbers indicated in the management file for thumbnail from the basic management file and transfers file names of the thumbnail files to the file system. Accordingly, a list of thumbnails can be displayed more quickly.

Processing for disk copying for transferring content files and management files recorded on the recording medium as described above to an external apparatus and recording them on a recording medium in the external apparatus is described below.

Figure 9:
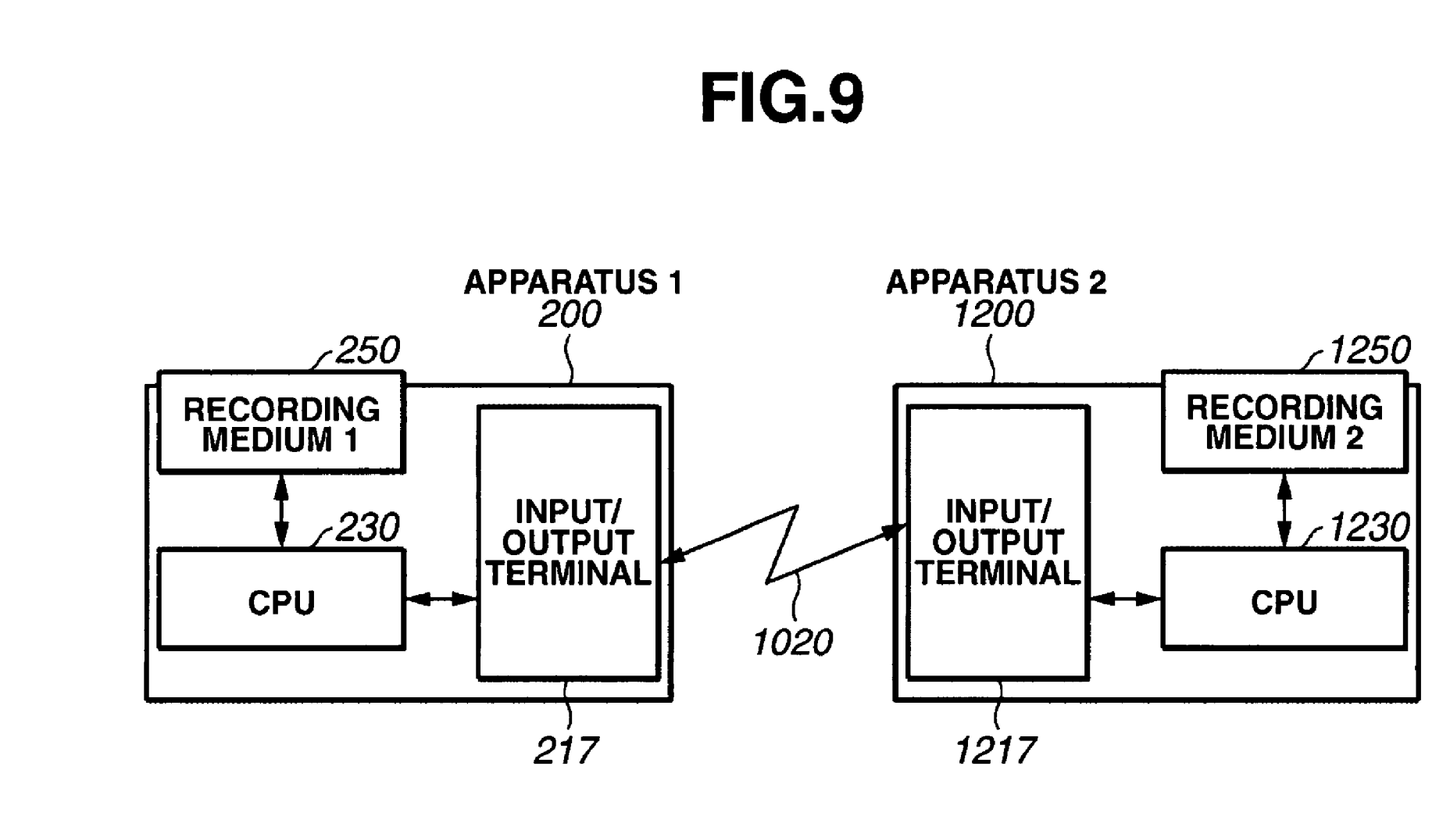
FIG. 9 is a diagram showing an example of the construction of a data transmission system according to an embodiment of the invention.

FIG. 9 is a diagram showing an example of the construction of a data transmission system according to an embodiment of the invention. In the data transmission system, two image capture apparatuses having the same configuration as that of the image capture apparatus 200 shown in FIG. 2 are connected with each other.

In FIG. 9, the first image capture apparatus 200 includes a CPU 230 for controlling the whole image capture apparatus 200, a recording medium 250, and an input/output terminal 217 for inputting or outputting a variety of information, as shown in FIG. 2. The second image capture apparatus 1200 includes a CPU 1230 for controlling the whole image capture apparatus 1200, a recording medium 1250, and an input/output terminal 1217 for inputting or outputting a variety of information.

The image capture apparatuses 200 and 1200 are physically connected via a cable 1020. In the present embodiment, examples of an interface for use in transfer of data include, but are not limited to, a serial bus, a parallel bus, USB (Universal Serial Bus), IEEE 1394 and wireless connection.

Referring to FIG. 9, processing for transmitting, from the image capture apparatus 200 on the transmitting end to the image capture apparatus 1200 on the receiving end, content files and management files recorded on the recording medium 250 and recording them on the recording medium 1250 is described below.

When an instruction for transferring data is issued by a user operating an operation key provided on the image capture apparatus 200, the CPU 230 selects, in accordance with a condition (to be described later), content files and management files recorded on the recording medium 250 and reads them from the recording medium 250. Then, the CPU 230 transfers the read content files and management files from the input/output terminal 217 to the image capture apparatus 1200 via the cable 1020. In the image capture apparatus 1200, the CPU 1230 writes the data received at the input/output terminal 1217 into the recording medium 1250.

Figure 10:
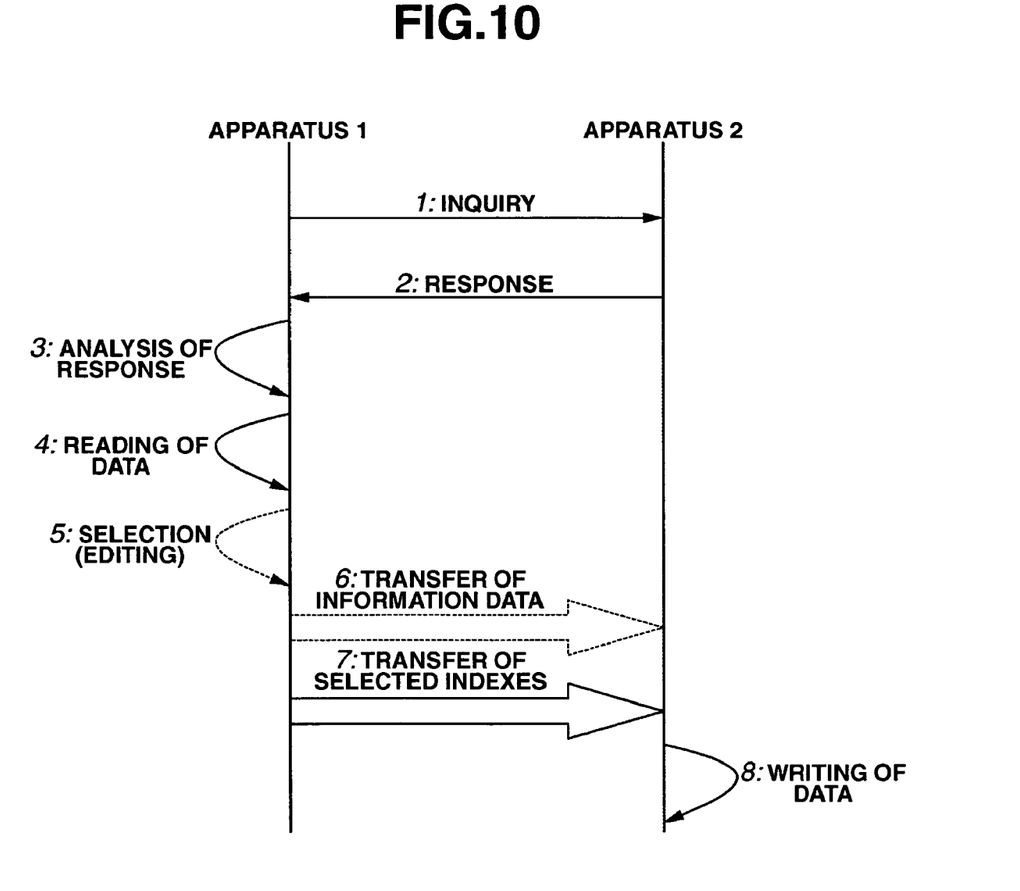
FIG. 10 is a diagram illustrating the sequence of transmission and receiving operations of the data transmission system shown in FIG. 9.

FIG. 10 is a diagram illustrating the sequence of the above-described transmission and receiving operations of the data transmission system shown in FIG. 9.

In FIG. 10, when an instruction for transferring data is issued, the CPU 230 inquires of the image capture apparatus 1200 its function or capability via the input/output terminal 217. When a response to the inquiry is transmitted from the image capture apparatus 1200 to the image capture apparatus 200, the CPU 230 receives the response at the input/output terminal 217 and analyzes information provided by the response, i.e., analyzes the function or capability of the image capture apparatus 1200. In accordance with the analyzed function or capability of the image capture apparatus 1200, the CPU 230 reads out management files recorded on the recording medium 250 and determines management files to be transmitted. In this instance, a basic management file can be handled in common by the image capture apparatus 200 and the image capture apparatus 1200. Therefore, the basic management file is transmitted regardless of the function of the image capture apparatus 1200.

On the other hand, unnecessary management files may be present depending on the function of the image capture apparatus 1200. For example, if the image capture apparatus 1200 does not have the function of displaying a hierarchy structure of a virtual directory as shown in FIG. 8, a management file for group management becomes useless in the image capture apparatus 1200. Therefore, the management file for group management may be inhibited from being transmitted.

If necessary, history information on transmission indexes can be added to the content of the basic management file. The history information on transmission indexes includes information indicating that a management file (index file) that is considered to be unnecessary in the image capture apparatus 1200 is present and is, therefore, not transmitted, information indicating that, while all management files are transmitted, an invalidity identifier for identifying a management file considered to be unnecessary in the image capture apparatus 1200 is provided, or the like.

The CPU 230 reads the content files, the basic management file and the selected management files from the recording medium 250 and transmits them to the image capture apparatus 1200 via the input/output terminal 217.

Then, the image capture apparatus 1200 records, on the recording medium 1250, the content files and management files transmitted from the image capture apparatus 1200. In this instance, the content files are recorded on the recording medium 1250 according to the file system with the same rule as that of a directory structure in the recording medium 250.

Figure 11:
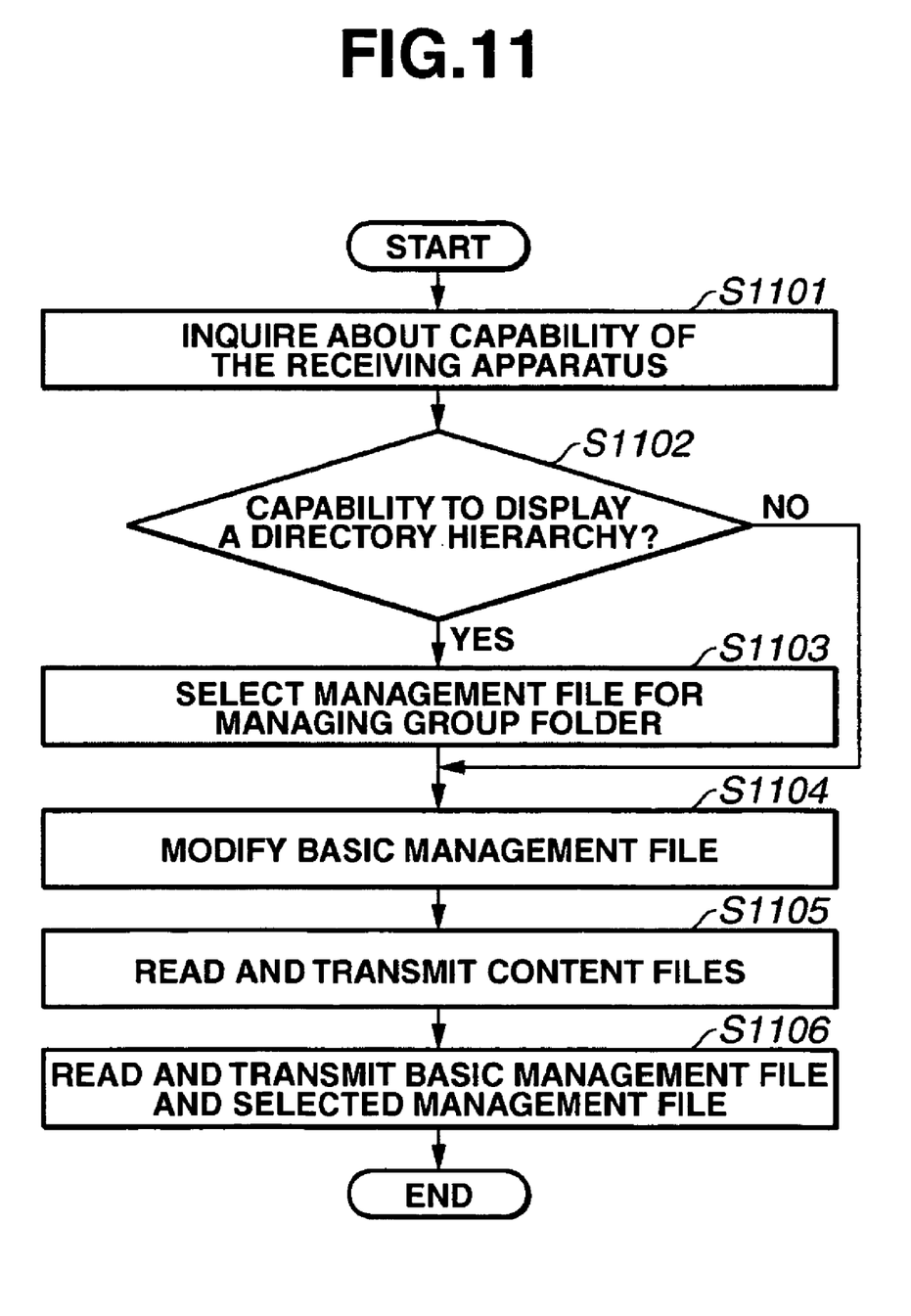
FIG. 11 is a flow chart illustrating processing operations of an image capture apparatus on the transmission end included in the data transmission system shown in FIG. 9.

FIG. 11 is a flow chart illustrating the above-described processing operations for disk copying performed by the image capture apparatus 200 on the transmitting end.

Referring to FIG. 11, processing for determining a management file to be transmitted depending on the presence or absence of the function of displaying a directory hierarchy is discussed below.

When an instruction for starting data transfer is issued, the CPU 230 inquires about the function or capability of the receiving apparatus 1200 at step S1101 and receives a response thereto from the receiving apparatus 1200. At step S1102, the CPU 230 checks to determine if the receiving apparatus 1200 has the capability to display a directory hierarchy. If it is determined that the receiving apparatus 1200 has the capability to display a directory hierarchy, the CPU 230 proceeds to step S1103. At step S1103, the CPU 230 selects a management file for managing a group folder, as a management file to be transmitted, and then proceeds to step S1104. If it is determined that the receiving apparatus 1200 does not have a capability to display a directory hierarchy, the CPU 230 proceeds from step S1102 to step S1104. At step S1104, the CPU 230 modifies the content of the basic management file and sets a management file (index file) representing a directory hierarchy untransmitted or invalid. At step S1105, the CPU 230 reads content files from the recording medium 250 and transmits them to the receiving apparatus 1200. At step S1106, the CPU 230 transfers the basic management file and the selected management file to the receiving apparatus 1200.

As described above, when content files recorded on a recording medium are transmitted to an external apparatus, a management file to be transmitted is selected from among management files other than a basic management file according to the function, performance or capability of the external apparatus, and the selected management file is transmitted to the external apparatus. Accordingly, only information conforming to the capability or product specification of the external apparatus can be transmitted. Therefore, data transfer time can be shortened, and excessive burdens are not imposed on the receiving external apparatus.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-053234 filed Feb. 27, 2004, which is hereby incorporated by reference herein.

What is claimed is:

1. A recording and reproducing apparatus comprising:
    a mounting mechanism arranged to mount a recording medium;
    a recording and reproducing unit configured to record an image file on the recording medium and to reproduce the image file from the recording medium;
    a first creating unit configured to create a basic management file for reproducing a plurality of image files recorded on the recording medium, wherein the basic management file is different from the image file and includes a plurality of indexes, each index respectively corresponding to one of the plurality of image files recorded on the recording medium, and each index including an image type attribute corresponding to one of the plurality of image files, a respective index of a thumbnail corresponding to one of the plurality of image files, a respective index number corresponding to one of the plurality of image files, and a respective name corresponding to one of the plurality of image files, wherein the basic management file manages reading of each image file recorded on the recording medium;
    an instruction unit configured to issue an instruction to generate a group including at least one of the plurality of image files recorded on the recording medium; and
    a second creating unit configured to create a group management file for managing each image file included in the group based on the basic management file, wherein the group management file is different from the image file and the basic management file, and includes attributes indicating the group, an index number of the group, a number of members registered in the group, and respective index numbers of the indexes included in the basic management file corresponding to the plurality of image files included in the group, wherein a virtual directory hierarchy of the group is created using indexes of the group management file,
    wherein the second creating unit creates a new group management file every time the instruction unit issues the instruction to generate a new group, and
    wherein the recording and reproducing unit records the basic management file and the group management file on the recording medium where the image files are recorded.

2. The recording and reproducing apparatus according to claim 1, further comprising:
    a display unit configured to display the image files recorded on the recording medium based on the group management file and the basic management file.

3. The recording and reproducing apparatus according to claim 1, wherein the first creating unit adds an index corresponding to the group to the basic management file in accordance with the instruction to generate the group, the group management file including index number of the index corresponding to the group.

4. A recording and reproducing apparatus comprising:
    a mounting mechanism arranged to mount a recording medium;
    a recording and reproducing unit configured to record an image file on the recording medium and to reproduce the image file from the recording medium;
    a first creating unit configured to create a basic management file for reproducing a plurality of image files recorded on the recording medium, a plurality of indexes, each index respectively corresponding to one of the plurality of image files recorded on the recording medium, and each index including an image type attribute corresponding to one of the plurality of image files, a respective index of a thumbnail corresponding to one of the plurality of image files, a respective index number corresponding to one of the plurality of image files and respective name corresponding to one of the plurality of image files, wherein the basic management file manages reading of each image file recorded on the recording medium;
    an instruction unit configured to issue an instruction to generate a group including at least one of the plurality of image files recorded on the recording medium;
    a second creating unit configured to create a group management file for managing each image file included in the group based on the basic management file, wherein the group management file is different from the image file and the basic management file, and includes attributes indicating the group, an index number of the group, a number of members registered in the group, and respective index numbers of the indexes included in the basic management file corresponding to the plurality of image files included in the group, wherein a virtual directory hierarchy of the group is created using indexes of the group management file; and
    a management unit configured to store the image file recorded on the recording medium in a folder and to manage the image file recorded on the recording medium, wherein the recording and reproducing unit records the basic management file and the group management file on the recording medium where the image files are recorded, and the management unit stores the basic management file and the group management file in the same folder.

5. A recording and reproducing apparatus comprising:

a mounting mechanism arranged to mount a recording medium;

a recording and reproducing unit configured to record an image file on the recording medium and to reproduce the image file from the recording medium;

a first creating unit configured to create a basic management file for reproducing a plurality of image files recorded on the recording medium, wherein the basic management file is different from the image file and includes a plurality of indexes, each index respectively corresponding to one of the plurality of image files recorded on the recording medium, and each index including an image type attribute corresponding to one of the plurality of image files, a respective index of a thumbnail corresponding to one of the plurality of image files, a respective index number corresponding to one of the plurality of image files, and a respective name corresponding to one of the plurality of image files, wherein the basic management file manages reading of each image file recorded on the recording medium;

an instruction unit configured to issue an instruction to generate a playlist indicating a reproduction order of the plurality of image files recorded on the recording medium; and a second creating unit configured to create a playlist management file for managing each image file including an index of the image files designated in the playlist based on the basic management file, wherein the playlist management file is different from the image file and the basic management file, and includes attributes indicating the playlist, an index number of the playlist, a number of members registered in the playlist, and respective index numbers of the indexes included in the basic management file corresponding to the plurality of image files designated in the playlist, wherein a virtual directory hierarchy of the playlist is created using indexes of the playlist management file, wherein the second creating unit creates a new playlist management file every time the instruction unit issues the instruction to generate a new playlist, and wherein the recording and reproducing unit records the basic management file and the playlist management file on the recording medium where the image files are recorded.

6. The recording and reproducing apparatus according to claim 5, wherein the recording and reproducing unit reproduces the plurality of image files from the recording medium in the reproduction order designated in the playlist based on the playlist management file and the playlist management file.

7. A recording and reproducing apparatus comprising:

a mounting mechanism arranged to mount a recording medium;

a recording and reproducing unit configured to record an image file on the recording medium and to reproduce the image file from the recording medium;

a first creating unit configured to create a basic management file for reproducing a plurality of image files recorded on the recording medium, wherein the basic management file is different from the image file and includes a plurality of indexes, each index respectively corresponding to one of the plurality of image files recorded on the recording medium, and each index including an image type attribute corresponding to one of the plurality of image files, a respective index of a thumbnail corresponding to one of the plurality of image files, a respective index number corresponding to one of the plurality of image files, and a respective name corresponding to one of the plurality of image files, wherein the basic management file manages reading of each image file recorded on the recording medium;

an instruction unit configured to issue an instruction to generate a playlist indicating a reproduction order of the plurality of image files recorded on the recording medium;

a second creating unit configured to create a playlist management file for managing each image file designated in the playlist based on the basic management file, wherein the playlist management file is different from the image file and the basic management file, and includes attributes indicating the playlist, an index number of the playlist, a number of members registered in the playlist, and respective index numbers of the indexes included in the basic management file corresponding to the plurality of image files designated in the playlist, wherein a virtual directory hierarchy of the playlist is created using indexes of the playlist management file, and a management unit configured to store the image files recorded on the recording medium in a folder and to manage the image files recorded on the recording medium, wherein the recording and reproducing unit records the basic management file and the playlist management file on the recording medium where the image files are recorded, and the management unit stores the basic management file and the playlist management file in the same folder.

* * * * *